(12) United States Patent
Nam et al.

(10) Patent No.: US 12,502,488 B2
(45) Date of Patent: Dec. 23, 2025

(54) DELIVERY DEVICE AND METHODS OF USE (71) Applicant: Boston Scientific Scimed, Inc., Maple Grove, MN (US)

(72) Inventors: Ra Nam, Lawrence, MA (US); Tony Soukalopoulos, Worcester, MA (US); Ryan Evers, Billerica, MA (US); Laurie A. Lehtinen, Boylston, MA (US); Matthew R. Jagelski, Milford, MA (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 1107 days.

(21) Appl. No.: 17/405,960

(22) Filed: Aug. 18, 2021

(65) Prior Publication Data
US 2022/0054771 A1 Feb. 24, 2022

Related U.S. Application Data (60) Provisional application No. 63/067,654, filed on Aug. 19, 2020.

(51) Int. Cl.
*A61M 13/00* (2006.01)
*A61M 25/00* (2006.01)

(52) U.S. Cl.
CPC ............ *A61M 13/00* (2013.01); *A61M 25/00* (2013.01); *A61M 2202/064* (2013.01)

(58) Field of Classification Search
CPC .. A61M 31/00; A61M 13/00; A61M 25/0043; A61M 2202/064; A61M 5/3015;
(Continued)

(56) References Cited

U.S. PATENT DOCUMENTS 471,854 A 3/1892 Gareis
881,238 A 3/1908 Hasbrouck
(Continued)

FOREIGN PATENT DOCUMENTS

CN 101401956 B 11/2012
CN 108882980 A 11/2018
(Continued)

OTHER PUBLICATIONS

Bridevaux, Pierre-Olivier, et al. "Short-term safety of thoracoscopic talc pleurodesis for recurrent primary spontaneous pneumothorax: a prospective European multicentre study." European Respiratory Journal 38.4 (2011): 770-773.
(Continued)

*Primary Examiner* — Laura A Bouchelle
*Assistant Examiner* — Sarah Dympna Grasmeder
(74) *Attorney, Agent, or Firm* — Bookoff McAndrews, PLLC (57) ABSTRACT A medical system includes a handle having (1) a handle chamber including an outlet and (2) a barrel extending into the handle chamber and defining a lumen having a longitudinal axis, and a spindle movably disposed within the lumen of the barrel, the spindle including a plurality of spindle enclosures, and wherein the spindle is configured to move between a first configuration, in which at least a portion of each of the plurality of spindle enclosures is positioned within a first portion of the lumen within the handle chamber, and a second configuration, in which at least the portion of each of the plurality of spindle enclosures is positioned in a second portion of the lumen outside the handle chamber.

19 Claims, 4 Drawing Sheets (58) Field of Classification Search
CPC ........ A61B 17/12181; A61B 17/00491; A61B 2090/00491; A61L 2400/04
See application file for complete search history.

(56) References Cited

U.S. PATENT DOCUMENTS

| | | | |
|---|---|---|---|
| 1,145,520 | A | 7/1915 | Smith |
| 1,599,959 | A | 9/1926 | Buheiji |
| 1,732,566 | A | 10/1929 | McKendrick |
| 2,151,418 | A | 3/1939 | Bolte |
| 2,185,927 | A | 1/1940 | Shelanski |
| 2,478,715 | A | 8/1949 | Schmitt |
| 2,623,519 | A | 12/1952 | Cohen |
| 3,669,113 | A | 6/1972 | Altounyan et al. |
| 3,940,061 | A | 2/1976 | Gimple et al. |
| 4,184,258 | A * | 1/1980 | Barrington ............. A61C 3/025 604/24 |
| 4,427,450 | A | 1/1984 | Kostansek |
| 4,457,329 | A | 7/1984 | Werley et al. |
| 4,806,167 | A | 2/1989 | Raythatha |
| 5,215,221 | A | 6/1993 | Dirksing |
| 5,231,983 | A | 8/1993 | Matson et al. |
| 5,273,531 | A | 12/1993 | Knoepfler |
| 5,312,331 | A | 5/1994 | Knoepfler |
| 5,312,333 | A | 5/1994 | Churinetz et al. |
| 5,366,122 | A | 11/1994 | Guentert et al. |
| 5,445,612 | A | 8/1995 | Terakura et al. |
| 5,470,311 | A | 11/1995 | Setterstrom et al. |
| 5,884,621 | A | 3/1999 | Matsugi et al. |
| 5,951,531 | A | 9/1999 | Ferdman et al. |
| 6,003,512 | A | 12/1999 | Gerde |
| 6,484,750 | B1 | 11/2002 | Foos et al. |
| 6,554,022 | B2 | 4/2003 | Wakeman |
| 6,589,087 | B2 | 7/2003 | Mackal et al. |
| 6,684,917 | B2 | 2/2004 | Zhu et al. |
| 6,708,712 | B2 | 3/2004 | Wakeman |
| 6,716,190 | B1 | 4/2004 | Glines et al. |
| 6,799,571 | B1 | 10/2004 | Hughes et al. |
| 7,178,547 | B2 | 2/2007 | Mackal |
| 7,311,270 | B2 | 12/2007 | Kapila |
| 7,334,598 | B1 | 2/2008 | Hollars |
| 7,361,300 | B2 | 4/2008 | Kelly et al. |
| 7,427,607 | B2 | 9/2008 | Suzuki |
| 7,455,248 | B2 | 11/2008 | Kablik et al. |
| 7,461,649 | B2 | 12/2008 | Gamard et al. |
| 7,544,177 | B2 | 6/2009 | Gertner |
| 7,563,299 | B2 | 7/2009 | Baptista da Costa et al. |
| 7,673,647 | B2 | 3/2010 | Mackal |
| 7,841,338 | B2 | 11/2010 | Dunne et al. |
| 7,892,205 | B2 | 2/2011 | Palasis et al. |
| 7,921,874 | B2 | 4/2011 | Tekulve et al. |
| 8,037,880 | B2 | 10/2011 | Zhu et al. |
| 8,097,071 | B2 | 1/2012 | Burgess et al. |
| 8,118,777 | B2 | 2/2012 | Ducharme et al. |
| 8,269,058 | B2 | 9/2012 | McCarthy et al. |
| 8,313,474 | B2 | 11/2012 | Campbell et al. |
| 8,360,276 | B2 | 1/2013 | Rogier et al. |
| 8,361,054 | B2 | 1/2013 | Ducharme et al. |
| 8,496,189 | B2 | 7/2013 | Lomond et al. |
| 8,673,065 | B2 | 3/2014 | Burgess et al. |
| 8,721,582 | B2 | 5/2014 | Ji |
| 8,728,032 | B2 | 5/2014 | Ducharme et al. |
| 8,741,335 | B2 | 6/2014 | McCarthy |
| 8,827,980 | B2 | 9/2014 | Ji |
| 8,910,627 | B2 | 12/2014 | Watschenko et al. |
| 8,951,565 | B2 | 2/2015 | McCarthy |
| 9,028,437 | B2 | 5/2015 | Ott et al. |
| 9,089,658 | B2 | 7/2015 | Dunne et al. |
| 9,101,744 | B2 | 8/2015 | Ducharme |
| 9,107,668 | B2 | 8/2015 | Melsheimer et al. |
| 9,132,206 | B2 | 9/2015 | McCarthy |
| 9,204,957 | B2 | 12/2015 | Gregory et al. |
| 9,205,170 | B2 | 12/2015 | Lucchesi et al. |
| 9,205,207 | B2 | 12/2015 | Ji |
| 9,205,240 | B2 | 12/2015 | Greenhalgh et al. |
| 9,308,584 | B2 | 4/2016 | Burgess et al. |
| 9,310,812 | B2 | 4/2016 | Costle et al. |
| 9,375,533 | B2 | 6/2016 | Ducharme et al. |
| 9,492,646 | B2 | 11/2016 | Hoogenakker et al. |
| 9,517,976 | B2 | 12/2016 | Mackal |
| 9,545,490 | B2 | 1/2017 | Watschenko et al. |
| 9,555,185 | B2 | 1/2017 | Foster et al. |
| 9,629,966 | B2 | 4/2017 | Ji |
| 9,636,470 | B2 | 5/2017 | Pohlmann et al. |
| 9,707,359 | B2 | 7/2017 | Kubo |
| 9,713,682 | B2 | 7/2017 | Eistetter et al. |
| 9,717,897 | B2 | 8/2017 | Rogier |
| 9,821,084 | B2 | 11/2017 | Diegelmann et al. |
| 9,839,772 | B2 | 12/2017 | Ducharme |
| 9,839,774 | B2 | 12/2017 | Bonaldo |
| 9,846,439 | B2 | 12/2017 | Carman et al. |
| 9,867,931 | B2 | 1/2018 | Gittard |
| 9,976,660 | B2 | 5/2018 | Stanton et al. |
| 10,004,690 | B2 | 6/2018 | Lee et al. |
| 10,010,705 | B2 | 7/2018 | Greenhalgh et al. |
| 10,017,231 | B2 | 7/2018 | Fawcett, Jr. |
| 10,036,617 | B2 | 7/2018 | Mackal |
| 10,065,004 | B2 | 9/2018 | Eder et al. |
| 10,173,019 | B2 | 1/2019 | Kaufmann et al. |
| 10,384,049 | B2 | 8/2019 | Stanton et al. |
| 10,463,811 | B2 | 11/2019 | Lee et al. |
| 10,507,293 | B2 | 12/2019 | Goodman et al. |
| 10,646,706 | B2 | 5/2020 | Rogier |
| 10,730,595 | B2 | 8/2020 | Fawcett |
| 10,751,523 | B2 | 8/2020 | Rogier |
| 10,806,853 | B2 | 10/2020 | Gittard |
| 10,840,814 | B2 | 11/2020 | Kusama et al. |
| 10,850,814 | B2 | 12/2020 | Fawcett |
| 10,994,818 | B2 | 5/2021 | Hernandez |
| 2004/0107963 | A1 | 6/2004 | Finlay et al. |
| 2004/0249359 | A1 | 12/2004 | Palasis et al. |
| 2005/0121025 | A1 | 6/2005 | Gamard et al. |
| 2005/0147656 | A1 | 7/2005 | McCarthy et al. |
| 2005/0220721 | A1 | 10/2005 | Kablik et al. |
| 2006/0004314 | A1 | 1/2006 | McCarthy et al. |
| 2006/0213514 | A1 | 9/2006 | Price et al. |
| 2007/0056586 | A1 | 3/2007 | Price et al. |
| 2007/0066920 | A1 | 3/2007 | Hopman et al. |
| 2007/0066924 | A1 | 3/2007 | Hopman et al. |
| 2007/0082023 | A1 | 4/2007 | Hopman et al. |
| 2007/0083137 | A1 | 4/2007 | Hopman et al. |
| 2007/0125375 | A1 | 6/2007 | Finlay et al. |
| 2007/0151560 | A1 | 7/2007 | Price et al. |
| 2007/0199824 | A1 | 8/2007 | Hoerr et al. |
| 2008/0021374 | A1 | 1/2008 | Kawata |
| 2008/0287907 | A1 | 11/2008 | Gregory et al. |
| 2009/0101144 | A1 | 4/2009 | Gamard et al. |
| 2009/0155342 | A1 | 6/2009 | Diegemann et al. |
| 2009/0281486 | A1 | 11/2009 | Ducharme |
| 2010/0121261 | A1 | 5/2010 | Kablik et al. |
| 2010/0305505 | A1 | 12/2010 | Ducharme et al. |
| 2011/0073200 | A1 | 3/2011 | Overvaag et al. |
| 2011/0274726 | A1 | 11/2011 | Guo et al. |
| 2011/0308516 | A1 | 12/2011 | Price et al. |
| 2014/0271491 | A1 | 9/2014 | Gittard et al. |
| 2015/0094649 | A1 | 4/2015 | Gittard |
| 2015/0125513 | A1 | 5/2015 | McCarthy |
| 2015/0164531 | A1* | 6/2015 | Faller ............ A61B 17/320092 606/169 |
| 2016/0375202 | A1 | 12/2016 | Goodman et al. |
| 2017/0106181 | A1 | 4/2017 | Bonaldo et al. |
| 2017/0232141 | A1 | 8/2017 | Surti et al. |
| 2017/0252479 | A1 | 9/2017 | Ji et al. |
| 2017/0296760 | A1* | 10/2017 | Lee ........................ A61M 11/00 |
| 2018/0050163 | A1 | 2/2018 | DeAnglis et al. |
| 2018/0099088 | A1 | 4/2018 | Gittard |
| 2018/0193574 | A1 | 7/2018 | Smith et al. |
| 2018/0214160 | A1 | 8/2018 | Hoskins et al. |
| 2018/0339144 | A1 | 11/2018 | Greenhalgh et al. |
| 2019/0134366 | A1 | 5/2019 | Erez et al. |
| 2019/0217315 | A1 | 7/2019 | Maguire et al. |
| 2019/0232030 | A1* | 8/2019 | Pic .................. A61B 17/00491 |

(56) References Cited

U.S. PATENT DOCUMENTS

| | | |
|---|---|---|
| 2021/0024187 A1 | 1/2021 | Fawcett et al. |
| 2021/0069485 A1 | 3/2021 | Rogier |

FOREIGN PATENT DOCUMENTS

| | | |
|---|---|---|
| DE | 60215438 T2 | 8/2007 |
| EP | 3052168 B1 | 11/2019 |
| JP | H07118305 A | 5/1995 |
| WO | 03013552 A1 | 2/2003 |
| WO | 2004066806 A2 | 8/2004 |
| WO | 2005062896 A2 | 7/2005 |
| WO | 2006071649 A2 | 7/2006 |
| WO | 2006088912 A2 | 8/2006 |
| WO | 2008033462 A2 | 3/2008 |
| WO | 2009061409 A1 | 5/2009 |
| WO | 2015050814 A1 | 4/2015 |
| WO | 2018157772 A1 | 9/2018 |

OTHER PUBLICATIONS

Giday, Samuel, et al. "Safety analysis of a hemostatic powder in a porcine model of acute severe gastric bleeding." Digestive diseases and sciences 58.12 (2013): 3422-3428.

Giday, Samuel A., et al. "A long-term randomized controlled trial of a novel nanopowder hemostatic agent for control of severe upper gastrointestinal bleeding in a porcine model." Gastrointestinal Endoscopy 69.5 (2009): AB133.

Giday, S. A., et al. "Long-term randomized controlled trial of a novel nanopowder hemostatic agent (TC-325) for control of severe arterial upper gastrointestinal bleeding in a porcine model." Endoscopy 43.04 (2011): 296-299.

Regalia, Kristen, et al. "Hemospray in Gastrointestinal Bleeding." Practical Gastroenterology. Endoscopy: Opening New Eyes, ser. 8, May 2014, pp. 13-24. 8.

Cook Medical. Hemospray Endoscopic Hemostat, Cook, 2014. (7 pages, in English).

"Hemospray Clinical Experience Shows Efficacy of a New Hemostasis Modality—v1", Cook Medical, 2012.

"Hemospray Clinical Experience Shows Efficacy of a New Hemostasis Modality—v2", Cook Medical, 2013.

"Hemospray Clinical Experience Shows Efficacy of a New Hemostasis Modality—v3", Cook Medical, 2014.

Aslanian, Harry R., and Loren Laine. "Hemostatic powder spray for GI bleeding." Gastrointestinal endoscopy 77.3 (2013): 508-510.

Giday, S. A., et al. "Long-term randomized controlled trial of a novel nanopowder hemostatic agent (TC-325) for control of severe arterial upper gastrointestinal bleeding in a porcine model." Endoscopy 43.04 (2011): 296-299. via ResearchGate.

RETSCH GmbH Haan. Sieve Analysis: Taking a Close Look at Quality, An Expert Guide to Particle Size Analysis. 2015. (56 pages, in English).

Micromeritics. Density Analysis, 2001. (6 pages, in English).

Micromeritics. "Application Note: Bulk and Skeletal Density Computations for the AutoPore." May 2012. (3 pages, in English).

Arefnia, Ali, et al. "Comparative Study on the Effect of Tire-Derived Aggregate on Specific Gravity of Kaolin." Electronic Journal of Geotechnical Engineering 18 (2013): 335-44.

Kesavan, Jana, et al. "Density Measurements of Materials Used in Aerosol Studies". Edgewood Chemical Biological Center Aberdeen Proving Ground MD, 2000.

International Search Report and Written Opinion issued on Nov. 25, 2021 in counterpart International Patent Application No. PCT/US2021/046570 (12 pages, in English).

\* cited by examiner

DELIVERY DEVICE AND METHODS OF USE

CROSS-REFERENCE TO RELATED APPLICATIONS

This application claims the benefit of priority of U.S. Provisional Patent Application No. 63/067,654, filed Aug. 19, 2020, the entirety of which is incorporated herein by reference.

TECHNICAL FIELD

This disclosure relates generally to medical systems and devices for delivering pressurized fluids and/or materials, and in embodiments, to methods and tools for controlling delivery of hemostatic agents while preventing clogging of the delivery device.

BACKGROUND

Delivery systems and devices are used to supply various materials, such as powders, during medical procedures. These procedures may include supplying powders using fluids, e.g., propellant fluids, within a range of appropriate pressures and/or flow rates. These powders may include hemostatic agents optimally delivered to tissue at an appropriate pressure and/or flow rate, for the particular application.

Conventional endoscopic devices and methods for dispensing fluids, powders, and/or reagents in a patient include advancing a catheter to a target site within the patient and subsequently dispensing the fluid. Drawbacks of conventional devices include, for example, clogging of the catheter with the fluid or powder, large variations in the flow rate and pressures of fluids during dispensing, and inconsistency in the material dispensed at the target site. These drawbacks may prevent a proper amount of fluid and/or material from being expelled at a target location and/or may prevent dosing of material, thereby decreasing the accuracy and increasing the time and cost of procedures using these conventional devices. The scope of the disclosure, however, is defined by the attached claims and not the ability to solve a specific problem.

SUMMARY OF THE DISCLOSURE

According to an aspect, a medical system includes a handle having (1) a handle chamber including an outlet and (2) a barrel extending into the handle chamber and defining a lumen having a longitudinal axis, and a spindle movably disposed within the lumen of the barrel, wherein the spindle includes a plurality of spindle enclosures, and wherein the spindle is configured to move between a first configuration, in which at least a portion of each of the plurality of spindle enclosures is positioned within a first portion of the lumen within the handle chamber, and a second configuration, in which at least the portion of each of the plurality of spindle enclosures is positioned in a second portion of the lumen outside the handle chamber.

The medical system may further include an inlet proximal the distal end of the handle chamber, wherein the inlet may be configured to receive a propellant fluid.

The medical system may further include a containment device configured to contain the propellant fluid, and an actuator configured to be actuated between a first state, wherein the propellant fluid may be supplied from the containment device to the handle chamber, and a second state, wherein the propellant fluid may not be supplied to the handle chamber.

The plurality of spindle enclosures may be radially disposed around a central axis of the spindle.

The medical system may further include a locking mechanism configured to allow the spindle to rotate about the longitudinal axis of the lumen of the barrel when the spindle is in the first configuration or in the second configuration, and to prevent the spindle from rotating about the longitudinal axis of the lumen of the barrel when the spindle translates between the first and the second configurations.

The handle chamber may be tapered toward a distal end of the handle chamber.

The barrel may include an opening fluidly connecting the lumen to the handle chamber.

The opening of the barrel may be disposed within the handle chamber.

The distal opening may have a same size as an opening of each of the plurality of spindle enclosures.

The barrel may include an opening on an exterior of the handle and configured to be in fluid communication with one of the plurality of spindle enclosures when the spindle is in the second configuration.

The spindle may be configured to slide along the barrel parallel to the longitudinal axis, and wherein the spindle may be configured to rotate within the barrel about the longitudinal axis.

The spindle may include a first seal disposed on a first side of the plurality of spindle enclosures along a longitudinal axis of the spindle, and a second seal disposed on a second side of the plurality of spindle enclosures along the longitudinal axis of the spindle, wherein the second side is opposite the first side.

The medical system may further include a catheter extending from the outlet.

A propellant fluid may be configured to mix with a medical agent in the handle chamber dispensed by one or more of the plurality of spindle enclosures, and wherein the mixture may be configured to be supplied to a target site via the catheter.

The handle chamber may include a proximal opening at a proximal end of the handle, and wherein the medical system may further include a cover configured to seal the proximal opening.

According to another aspect, a medical device may include a handle having (1) a handle chamber including an outlet and a propellant fluid inlet proximate a distal end of the handle chamber and (2) a barrel extending into the handle chamber and defining a lumen having a longitudinal axis and a distal opening fluidly connecting the lumen with the handle chamber, and a spindle rotatable and longitudinally movable within the lumen of the barrel, wherein the spindle includes a plurality of enclosures, wherein one or more of the plurality of enclosures are configured to contain a medical agent, wherein the medical agent is configured to be dispensed from the one or more of the plurality of enclosures to the handle chamber when the one or more of the plurality of enclosures are aligned with the distal opening.

The barrel may further comprise a fill opening disposed outside the handle chamber, wherein the spindle may be configured to move within the lumen between a first state, in which one of the plurality of enclosures is aligned with the fill opening, and a second state, in which one of the plurality enclosures is aligned with the distal opening, and wherein the spindle further includes a locking mechanism configured to allow the spindle to rotate within the lumen of the barrel when the spindle is in the first configuration or in the second configuration, and may prevent the spindle from rotating within the lumen of the barrel when the spindle translates between the first and the second configurations.

According to another aspect, a method for performing a medical treatment in a body may include inserting a catheter, connected at a proximal end to a handle, through an opening in the body, and advancing the catheter to a target site, rotating a spindle within a lumen of a barrel about a longitudinal axis of the lumen, wherein the spindle includes a plurality of enclosures arranged radially about the spindle, supplying a medical agent from one or more of the plurality of enclosures to the handle chamber, wherein the medical agent is configured to mix with the propellant fluid, supplying a propellant fluid to a handle chamber of the handle, and supplying the mixture of the medical agent and the propellant gas to the target site via the catheter.

The method may further include dispensing the medical agent into one or more of the plurality of enclosures via a fill opening in the barrel prior to supplying the medical agent to the handle chamber.

The method may further include sliding the spindle along a longitudinal axis of the barrel between a first state, in which the medical agent is dispensed into the one or more of the plurality of enclosures via the fill opening, and a second state, in which the medical agent is dispensed from one or more of the plurality of enclosures via the distal opening.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

This disclosure is now described with reference to exemplary medical devices that may be used in dispensing materials. However, it should be noted that reference to any particular procedure is provided only for convenience and not intended to limit the disclosure. A person of ordinary skill in the art would recognize that the concepts underlying the disclosed devices and application methods may be utilized in any suitable procedure, medical or otherwise. This disclosure may be understood with reference to the following description and the appended drawings, wherein like elements are referred to with the same reference numerals.

For ease of description, portions/regions/ends of a device and/or its components are referred to as proximal and distal ends/regions. It should be noted that the term "proximal," as it relates to an application device, is intended to refer to ends/regions closer to an inlet of a propellant gas to the application device (e.g., at a location of the application device where the propellant gas is released from a containment device into the application device), and the term "distal," as it relates to an application device, is used herein to refer to ends/regions where the propellant gas and/or any material is released from the application device to a target area or, if a catheter is attached to the application device, from the catheter to the target area. "Proximal" therefore refers to areas closer to a user of the device, and "distal" refers to areas further from a user of the device. Similarly, extends "distally" indicates that a component extends in a distal direction, and extends "proximally" indicates that a component extends in a proximal direction. Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, relative terms, such as, for example, "about," "substantially," "generally," and "approximately" are used to indicate a possible variation of ±10% in a stated value or characteristic.

Figure 1:
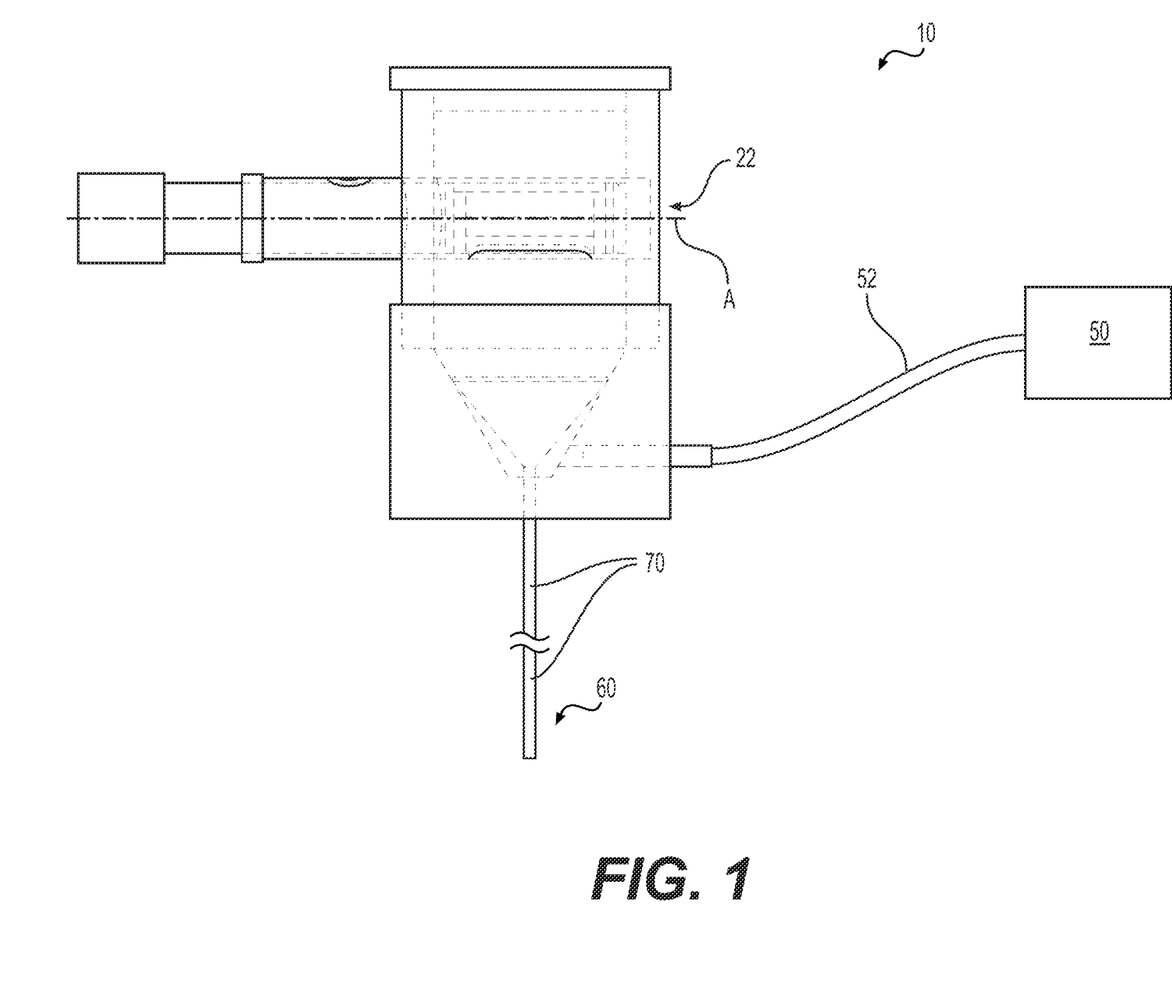
FIG. 1 is a schematic of an exemplary medical system according to an embodiment of the present disclosure.

Referring to FIG. 1, a medical system 10 (e.g., a delivery system) according to an embodiment is shown. Medical system 10 includes a handle having a body 22, a catheter 70 connected to a distal end of body 22, and a containment device 50 connected to body 22 via a tube 52. It is desirable for material to be properly and consistently dispensed to the target location, and medical system 10 may solve one or more of these problems or other problems in the art.

Containment device 50 may include any fluid for delivering powder, fluid, or other particles contained within body 22 to a target site. For example, the fluid contained in containment device 50 may include carbon dioxide ($CO_2$) or any other known delivery fluid, such as oxygen or nitrogen. The fluid may be pressurized, for example, to a pressure of approximately 15 pounds per square inch (PSI) to a pressure of approximately 40 PSI. Containment device 50 may include an actuator (e.g., a trigger device) (not shown) for actuating the release of the fluid from containment device 50. Alternatively, or additionally, an actuator (not shown) may be provided along tube 52 and/or on body 22 to actuate the release of fluid from containment device 50 during use. Containment device 50 may include any structure and material suitable for containing pressurized propellant fluids. Containment device 50 may also be a propellant fluid line connected to a centralized propellant fluid source, e.g., a propellant fluid line in a hospital or other medical center.

Containment device 50 may be connected to body 22 via tube 52. Tube 52 may be flexible or inflexible, and may be any shape and size. Tube 52 may include a medical-grade resin, a medical-grade metal, or any other material suitable for dispersing propellant fluid from containment device 50 to body 22. An actuator device (not shown) may be attached to tube 52, which may be actuated to release fluid from containment device 50 to body 22.

Figure 3:
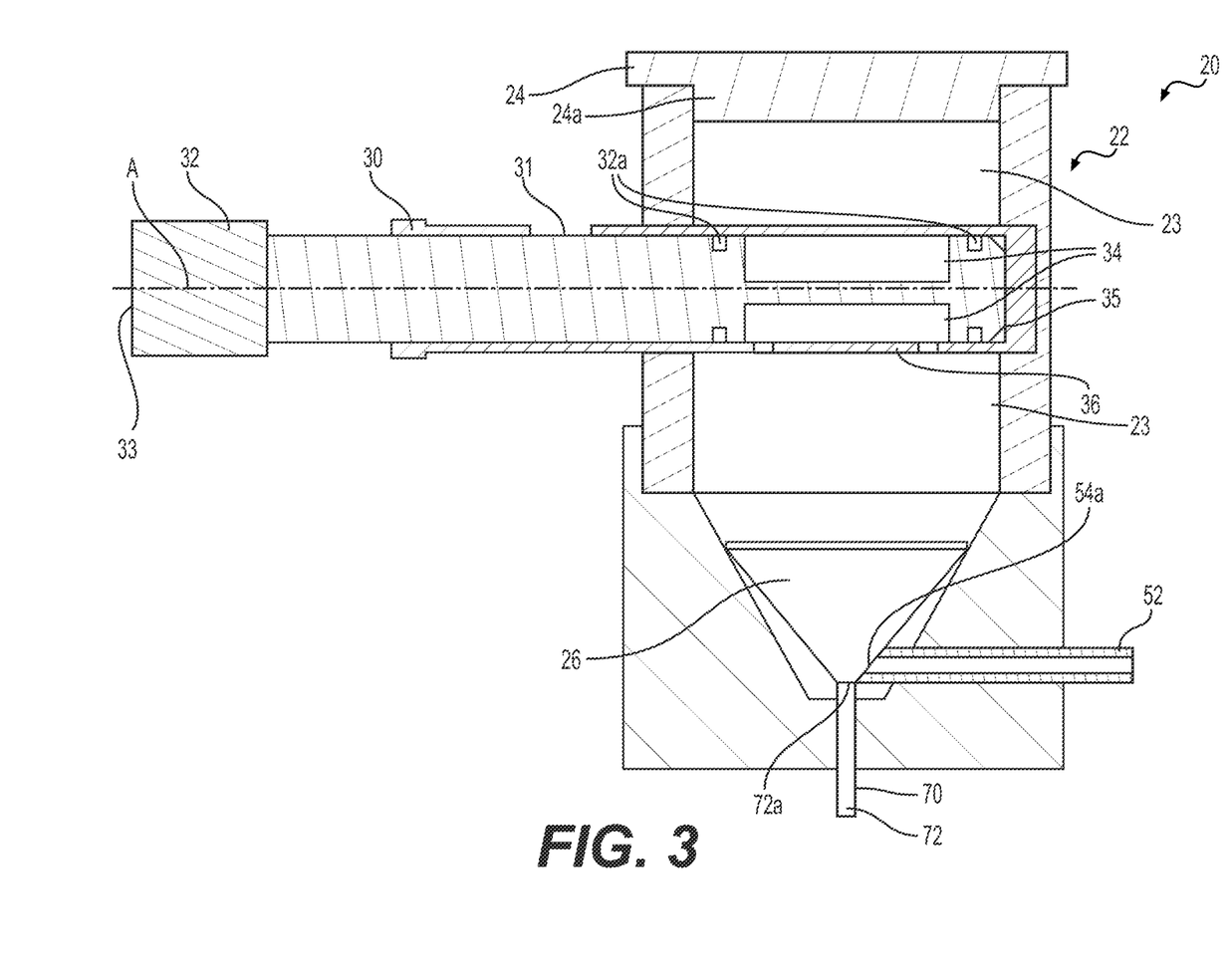
FIG. 3 is a cross-section of the medical system of FIG. 1.

Catheter 70 may extend from the distal end of body 22. Catheter 70 may transport a mixture of propellant fluid and medicament, particles, and/or other fluid from body 22 to a target site via a lumen 72 (FIG. 3). As discussed herein, a distal tip 60 may be advanced to a target site, e.g., a target site within a patient, and the mixture of propellant fluid and other fluid or solid (e.g., in the form of particles) from body 22 may be applied to the target site. Catheter 70 may comprise any medical-grade material suitable for insertion into a human body. Catheter 70 may be flexible to access tortuous paths within the body, and/or may have sufficient rigidity to be pushed distally into a patient. In some embodiments, distal tip 60 may be an articulation tip and may be articulated in one or more directions around a longitudinal axis of catheter 70. Alternatively, or additionally, catheter 70 may be introduced to a patient via an endoscope device. For example, a sheath of an endoscope device may be positioned within the patient, and catheter 70 may be advanced along a lumen of the sheath and out a distal opening of the lumen. In this manner, the fluid mixture from body 22 may be supplied to the target site. The mixture may be supplied to the target site at a rate of approximately 5-15 liters/minute, although other application rates may be used.

Figure 2:
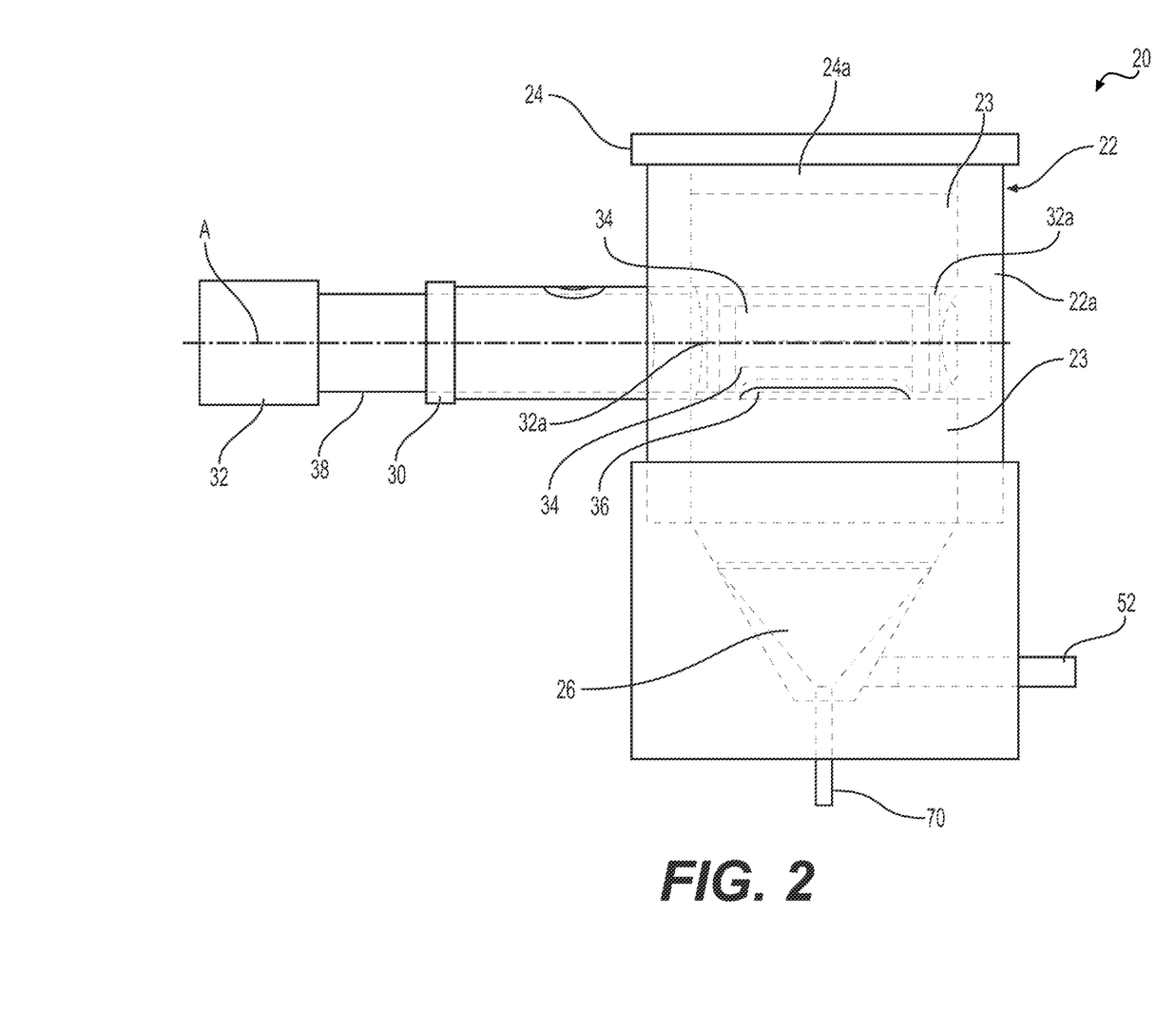
FIG. 2 is a side view of the medical system of FIG. 1, according to an embodiment.

With reference to FIG. 2, body 22 of handle 20 includes a chamber 23 and a barrel (e.g., a shaft having a central lumen) 30, and a spindle 32 extending through the central lumen of barrel 30 into chamber 23. A cap 24 is provided at a proximal end of body 22 and seals chamber 23 from an outer atmosphere. Cap 24 may be any shape and may conform to a shape of body 22. For example, body 22 may be cylindrically shaped, and cap 24 may have a similar cylindrical shape. According to examples, cap 24 may be flush with a radially outer surface of body 22, or cap 24 may extend past the radially outer surface of body 22 to allow a user to grasp cap 24 and remove cap 24. Cap 24 may include a protrusion 24a which may conform to a shape of an outer wall of chamber 23. For example, protrusion 24a may extend at least partially into chamber 23 to affix cap 24 to body 22. Cap 24 may be attached in any manner, e.g., via a friction fit between protrusion 24a and the outer wall of chamber 23, via an adhesive, or via other attachment means. Further, cap 24 may be removably affixed to body 22, or may be welded or otherwise permanently affixed to body 22. Cap 24 may be attached in a manner that sustains sufficient pressures within chamber 23 such that cap 24 maintains a proper seal when the propellant fluid is introduced into chamber 23. For example, a pressure within chamber 23 may be approximately 15 PSI to approximately 20 PSI when the propellant fluid is supplied to chamber 23. In one example, chamber 23 may have volume approximately equal to the volume equivalent of one gram of the medical agent.

Spindle 32 is described with reference to FIGS. 2, 3, and 4. Spindle 32 is generally cylindrical and is configured to rotate within barrel 30, about a longitudinal axis A and to move longitudinally along longitudinal axis A of barrel 30, as will be described herein. At a first end, spindle 32 includes a handle 33 and a body 38 extending from handle 33. Handle 33 may be any shape, and is configured to be grasped by a user to move spindle 32 relative to barrel 30. Handle 33 may have a diameter greater than an outer diameter of the lumen of barrel 30. For example, handle 33 may contact an outer surface of barrel 30 to prevent movement of spindle 32 into barrel 30 along longitudinal axis A. In another example, body 38 of spindle 32 may have a length greater than a length of the lumen of barrel 30 such that handle 33 does not contact barrel 30.

Body 38 of spindle 32 includes a plurality of enclosures (e.g., spindle enclosures) 34 at an end of spindle 32 opposite handle 33. Enclosures 34 are arranged radially about spindle 32 and are configured to receive and dispense a medical agent, e.g., a powder, a fluid, or the like. Enclosures 34 may be sized to receive a specific amount of the medical agent. For example, each enclosure 34 may have a size equal to a predetermined dose, such that a user filling each enclosure 34 will understand the amount of medical agent that will be dispensed to the patient using each enclosure 34. In some cases, each enclosure 34 may contain a portion of the total dose of the medical agent. For example, if there are ten enclosures, each enclosure 34 may contain 10% of the total dosage. In this manner, the user may administer the medical agent at a known rate, e.g., 10% of the total dosage at a time. Alternatively, or additionally, the user may determine that only a portion of the total dosage is necessary. Thus, a user may empty only some of enclosure 34 into chamber 23, such that the patient is administered only a portion of the dose. The number of enclosures 34 used for delivery may be determined based on a medical procedure or the like to allow the user to select different doses of the medical agent for delivery to the patient, based on patient feedback or other feedback (e.g., via sensor, tests, or the like). Additionally, or alternatively, enclosures 34 may have difference sizes or volumes to provide different dosages. Additionally, handle 33 may include a label or other indication indicating the dosage and/or the chamber being used. In this manner, a user may better understand how much medical agent is administered during a procedure.

Body 38 may also include one or more seals 32a. Seals 32a may include a rubber gasket, an O-ring, or any like sealing device. Seals 32a may be disposed on either side of enclosures 34 along longitudinal axis A and may prevent the medical agent contained within enclosures 34 from being released as spindle 32 is moved along longitudinal axis A, as will be described herein. Seals 32a may include a square cross-sectional shape for sealing contact with inner surface of barrel 30.

Spindle 32 may further include a locking mechanism 35, which may prevent spindle 32 from rotating about longitudinal axis A when the end of spindle 32 opposite handle 33 is not flush against a sidewall of barrel 30 opposite the opening of the lumen in barrel 30 (e.g., the closed position). Locking mechanism 35 may prevent spindle 32 from dispensing the medical agent until enclosures 34 are disposed entirely within chamber 23. In this manner, it may be possible to ensure that all of the medical agent is dispensed into chamber 23, such that the medical agent may be properly administered to the patient. Locking mechanism 35 may also allow spindle 32 to rotate about longitudinal axis A when enclosures 34 are aligned with a proximally facing opening 31 in barrel 30 (e.g., an open configuration or a second configuration), as will be described herein. In this manner, enclosures 34 may be filled with the medical agent. Alternatively, or additionally, markers may be arranged on spindle 32 and barrel 30. The markers may, for example, indicate which number enclosure 34 is aligned with distally facing opening 36 (see FIGS. 2, 3, and 4). To deliver the medical agent stored from the number two enclosure 34 to chamber 23, for example, a user may rotate spindle 32 to align marker "2" with the marker on barrel 30. Subsequently, the user may rotate spindle 32 to align marker "3" with the marker on barrel 30, and may continue this process until the desired amount of the medical agent is supplied to the target site.

Figure 4:
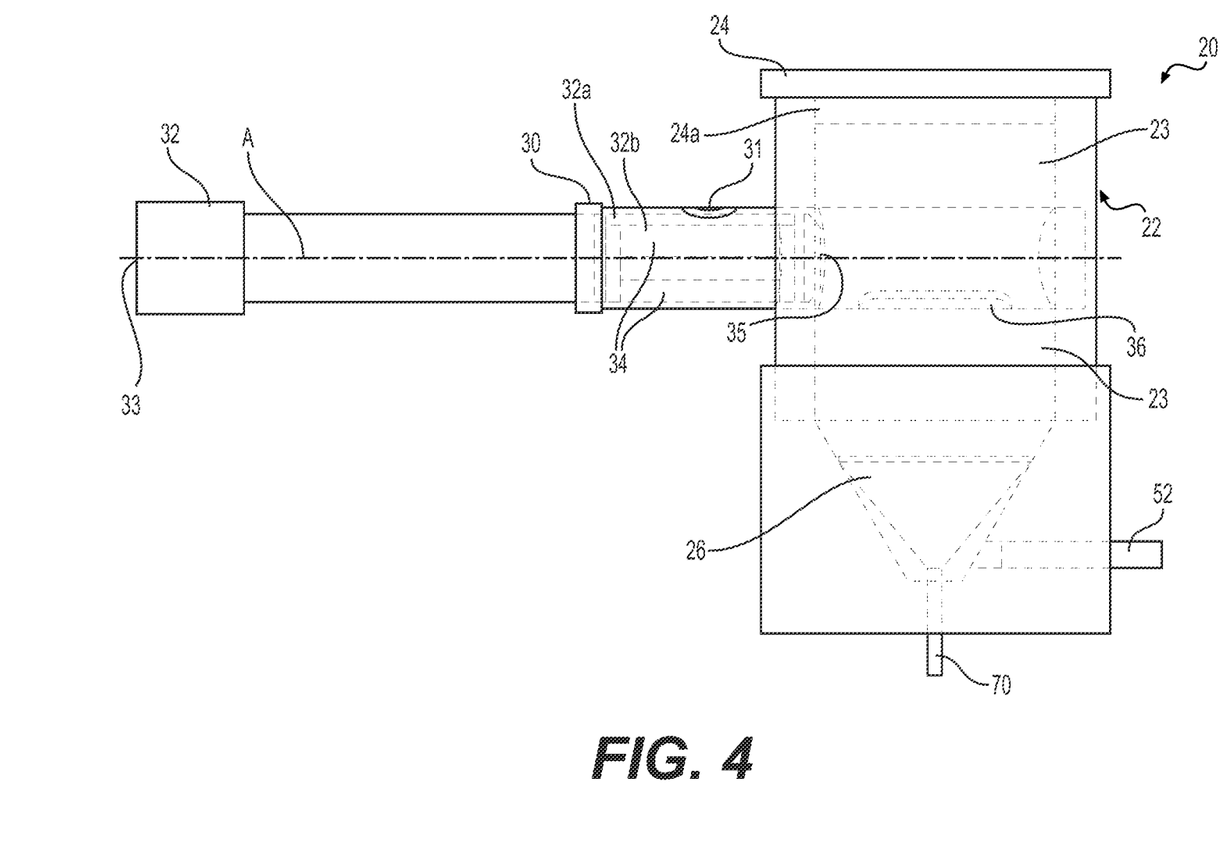
FIG. 4 is a side view of the medical system of FIG. 1, according to an embodiment.

With continued reference to FIGS. 2, 3, and 4, barrel 30 includes proximally facing opening 31 (e.g., a first opening or a fill inlet) and distally facing opening 36 (e.g., a second opening or an outlet). Opening 31 is configured to receive the medical agent and deliver the medical agent to enclosures 34 when enclosures 34 are aligned with opening 31 in the open configuration. Openings 31 and 36 are on opposite sides of barrel 30. Opening 31 may be any size or shape suitable for filling enclosures 34. After an enclosure 34 is filled via opening 31, the user may rotate spindle 32 via handle 33 until each enclosure 34 is filled. In some instances, it may be desired that only some of enclosures 34 are filled with the medical agent.

Opening 36 is configured to allow the medical agent in enclosures 34 to be emptied into chamber 23. As will be described herein, spindle 32 may be rotated about longitudinal axis A when in a closed configuration (e.g., a first configuration). As spindle 32 is rotated and an enclosure 34 is aligned with opening 36, the medical agent contained within that enclosure 34 may be emptied into chamber 23 via, e.g., gravity. Opening 36 may be any size and shape suitable for emptying the medical agent from enclosures 34. In one example, opening 36 may be equal to or greater than a size and an area of enclosures 34. In another instance, the size and the area of opening 36 may be less than the size and the area of enclosures 34. The side walls of opening 36 may be tapered outwardly to allow the medical agent to pass from the enclosures 34 into chamber 23. It will be understood that enclosures 34 not aligned with opening 36 are fluidly sealed from chamber 23. As spindle 32 is rotated, each enclosure 34 is aligned with opening 36. Each enclosure 34 aligned with opening 36 is fluidly coupled to chamber 23 only while enclosure 34 is aligned with opening 36.

With continued reference to FIGS. 2, 3, and 4, chamber 23 is generally cylindrical in shape with a distal portion 26 having a cone or funnel shape. Chamber 23 is bisected by barrel 30, which passes into chamber 30 via an opening (not shown). In this manner, opening 36 is positioned in chamber 23 to allow the medical agent to be dispensed into chamber 23.

Distal portion 26 tapers in a distal direction away from chamber 23. A distal opening 72a (FIG. 3) connects distal portion 26 to catheter 70. An opening 54a in a sidewall of distal portion 26 allows tube 52 to be connected to chamber 23 and to form a fluid path from containment device 50 to chamber 23. In this manner, propellant fluid may travel from containment device 50 to chamber 23, mix with the medical agent released from enclosures 34, and the mixture may travel along catheter 70 to the target site.

An example of filling enclosures 34 and dispensing the medical agent from enclosures 34 will be described with reference to FIGS. 2, 3, and 4. In some instances, medical system 10 is not preloaded with the medical agent. In this case, the user may fill one or more of enclosures 34. As shown in FIG. 4, spindle 32 is moved along longitudinal axis A to the open configuration, such that one of the plurality of enclosures 34 is aligned with opening 31. The user may deposit the medical agent into enclosure 34 via opening 31. Subsequently, the user may rotate spindle 32 via handle 33 in a clockwise direction such that an adjacent enclosure 34 is aligned with opening 31. The user may deposit the medical agent in the adjacent enclosure. The user may continue to perform these steps until each of enclosures 34 are filled with the medical agent. Alternatively, the user may fill only some of enclosures 34. It will be understood that different medical agents may be used in some of enclosures 34, according to a desired medical treatment.

Once enclosures 34 are filled with the medical agent, the user may slide spindle 32 along longitudinal axis A to the closed position, as shown in FIGS. 2 and 3. In the event each enclosure 34 is filled with the medical agent, moving spindle 32 to the closed position will result in the medical agent in enclosure 34 aligned with opening 36 to be deposited into distal portion 26. In some instances, spindle 32 is rotated to align one of the enclosures 34 without the medical agent to be pointed in the distal direction prior to moving spindle 32 to the closed position. In this manner, the medical agent may not be deposited into distal portion 26 until the propellant fluid is supplied from containment device 50. Once spindle 32 is moved to the closed configuration, the medical agent may be supplied to the target tissue.

For example, a method of applying the medical agent to the target site will now be described with reference to FIGS. 2 and 3. Distal tip 60 of catheter 70 is inserted into a patient via an opening in the body, e.g., an incision or a natural orifice. Alternatively, catheter 70 may be inserted through a prepositioned scope, e.g., an endoscope, an ureteroscope, or the like. Distal tip 60 is advanced to the target site. Imaging devices associated with the scope and/or external devices may be used to assist in positioning distal tip 60 at the target site.

Once distal tip 60 is positioned at the target site and spindle 32 is in the closed configuration, the actuator is actuated to release propellant fluid from containment device 50 to chamber 23, via tube 52. At this time, spindle 32 is in the closed configuration and enclosure 34 aligned with opening 36 is empty. The user may subsequently rotate spindle 32 via handle 33 such that an adjacent enclosure 34 is aligned with opening 36 (e.g., spindle 32 may be rotated clockwise). As the adjacent enclosure 34 is aligned with opening 36, the medical agent is dispensed from enclosure 34 through opening 36 and into distal portion 26 of chamber 23 via, e.g., gravity. As the medical agent is dispensed toward distal portion 26, the propellant fluid entering distal portion 26 via tube 52 mixes with the medical agent. The medical agent and propellant fluid mixture is supplied from distal portion 26, through catheter 70, to the target site. Alternatively, the user may dispense the medical agent into distal portion 26 of chamber 23 before actuating the propellant gas. Once the medical agent is dispensed in chamber 23, the user may then actuate the propellant gas as described herein.

In the event the user wishes to supply additional medical agent to the target site, the user may again rotate spindle 32 in the clockwise or counterclockwise direction to the next adjacent enclosure 34. The medical agent from this enclosure 34 is dispensed into distal portion 26 and supplied to the target site, as described above. The user may continue to rotate spindle 32 until a desired amount of the medical agent is dispensed from enclosures 34 and supplied to the target site. Once the user determines that a sufficient amount of the medical agent has been supplied to the target site, the user may activate the actuator to turn of supply of the propellant gas to chamber 23. In this manner, enclosures 34 may be prefilled with a medical agent and the user may dispense the medical agent from each of enclosures 34 and supply all of the medical agent from enclosures 34 to the target site, or may select to dispense the medical agent from less than all of enclosures 34 and supply only a portion of the total amount of medical agent stored in enclosures 34 to the target site.

It will be understood that, unless specifically set forth herein, any material known in the art may be used for the various elements. For example, features may include a medical grade plastic or rubber, a ceramic, a metal, or a combination thereof.

It will be apparent to those skilled in the art that various modifications and variations can be made to the disclosed device without departing from the scope of the disclosure. For example, the configuration of enclosures arranged radially about spindle 30 may allow for a pulsing action (e.g., allow a medical agent to be supplied to the target site in a pulsed manner), may limit the amount of the medical agent in distal portion 26, which may prevent clogging of catheter 70, and may prevent the medical agent from being supplied to chamber 23 when the propellant gas is not supplied to chamber 23, which may allow the medical agent to become stuck on surfaces of chamber 23 and clog or otherwise damage medical system 10. Further, embodiments allow the medical agent to be provided at different doses, which allows a same medical system 10 to be used for patients of varying size and/or patients with different medical conditions. Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A medical system, comprising:

a handle having (1) a handle chamber configured to receive an agent and including an outlet for releasing the agent received in the handle chamber, and (2) a barrel extending into the handle chamber and defining a lumen having a longitudinal axis, wherein the barrel includes an opening on an exterior of the handle; and a spindle movably disposed within the lumen of the barrel such that the spindle extends into the handle chamber, wherein the spindle includes a plurality of spindle enclosures, and wherein the spindle is configured to move inside the handle chamber between a first configuration, in which at least a portion of each of the plurality of spindle enclosures is positioned within a first portion of the lumen within the handle chamber, and a second configuration, in which at least the portion of each of the plurality of spindle enclosures is positioned in a second portion of the lumen outside the handle chamber, wherein the opening is in fluid communication with one of the plurality of spindle enclosures when the spindle is in the second configuration.

2. The medical system according to claim 1, further comprising an inlet proximal to a distal end of the handle chamber, wherein the inlet is configured to receive a propellant fluid.

3. The medical system according to claim 2, further comprising a containment device configured to contain the propellant fluid, and an actuator configured to be actuated between a first state, wherein the propellant fluid is supplied from the containment device to the handle chamber, and a second state, wherein the propellant fluid is not supplied to the handle chamber.

4. The medical system according to claim 1, wherein the plurality of spindle enclosures are radially disposed around a central axis of the spindle.

5. The medical system according to claim 1, further comprising a locking mechanism configured to allow the spindle to rotate about the longitudinal axis of the lumen of the barrel when the spindle is in the first configuration or in the second configuration, and to prevent the spindle from rotating about the longitudinal axis of the lumen of the barrel when the spindle translates between the first and the second configurations.

6. The medical system according to claim 1, wherein the handle chamber is tapered toward a distal end of the handle chamber.

7. The medical system according to claim 1, wherein the barrel includes a distal-facing opening fluidly connecting the lumen to the handle chamber.

8. The medical system according to claim 7, wherein the distal-facing opening of the barrel is disposed within the handle chamber.

9. The medical system according to claim 7, wherein the distal-facing opening has a same size as an opening of each of the plurality of spindle enclosures.

10. The medical system according to claim 1, wherein the spindle is configured to slide along the barrel parallel to the longitudinal axis, and wherein the spindle is configured to rotate within the barrel about the longitudinal axis.

11. The medical system according to claim 1, wherein the spindle includes a first seal disposed on a first side of the plurality of spindle enclosures along a longitudinal axis of the spindle, and a second seal disposed on a second side of the plurality of spindle enclosures along the longitudinal axis of the spindle, wherein the second side is opposite the first side.

12. The medical system according to claim 1, further comprising a catheter extending from the outlet.

13. The medical system according to claim 12, wherein a propellant fluid is configured to mix with the agent in the handle chamber to form a mixture dispensed by one or more of the plurality of spindle enclosures, and wherein the mixture is configured to be supplied to a target site via the catheter.

14. The medical system according to claim 1, wherein the handle chamber includes a proximal opening at a proximal end of the handle, and wherein the medical system further includes a cover configured to seal the proximal opening.

15. A medical device, comprising:

a handle having (1) a handle chamber configured to receive a medical agent, the handle chamber including an outlet for releasing the medical agent received in the handle chamber and a propellant fluid inlet proximate a distal end of the handle chamber and (2) a barrel extending into the handle chamber and defining a lumen having a longitudinal axis, and a distal opening fluidly connecting the lumen with the handle chamber, wherein the distal opening is formed on an exterior of the handle; and a spindle rotatable and longitudinally movable within the lumen of the barrel such that the spindle extends into the handle chamber to separate the medical agent from the outlet, wherein the spindle includes a plurality of enclosures, wherein one or more of the plurality of enclosures are configured to contain the medical agent, wherein the medical agent is configured to be dispensed from the one or more of the plurality of enclosures to the handle chamber when the one or more of the plurality of enclosures are aligned and in fluid communication with the distal opening.

16. The medical device according to claim 15, wherein the barrel further comprises a fill opening disposed outside the handle chamber, wherein the spindle is configured to move within the lumen between a first state, in which one of the plurality of enclosures is aligned with the fill opening, and a second state, in which one of the plurality enclosures is aligned with the distal opening, and wherein the spindle further includes a locking mechanism configured to allow the spindle to rotate within the lumen of the barrel when the spindle is in the first configuration or in the second configuration, and to prevent the spindle from rotating within the lumen of the barrel when the spindle translates between the first and the second configurations.

17. A method for performing a medical treatment in a body, the method comprising:

inserting a catheter, connected at a proximal end to a handle, through an opening in the body, and advancing the catheter to a target site;

rotating a spindle within a lumen of a barrel about a longitudinal axis of the lumen, the barrel extending into a handle chamber of the handle that stores a medical agent, wherein the barrel includes an opening on an exterior of the handle, and wherein the spindle includes a plurality of enclosures arranged radially about the spindle;

supplying the medical agent from one or more of the plurality of enclosures to an outlet of the handle chamber via the opening of the barrel, wherein the medical agent is configured to mix with a propellant fluid to form a mixture;

supplying the propellant fluid to the handle chamber of the handle; and supplying the mixture of the medical agent and the propellant fluid to the target site via the catheter.

18. The method according to claim 17, further comprising:

dispensing the medical agent into one or more of the plurality of enclosures via a fill opening in the barrel prior to supplying the medical agent to the outlet of the handle chamber.

19. The method according to claim 18, further comprising:

sliding the spindle along a longitudinal axis of the barrel between a first state, in which the medical agent is dispensed into the one or more of the plurality of enclosures via the fill opening, and a second state, in which the medical agent is dispensed from one or more of the plurality of enclosures via a distal opening of the barrel.

* * * * *